(12) United States Patent
Saito (10) Patent No.: US 6,830,841 B2
(45) Date of Patent: Dec. 14, 2004

(54) FUEL CELL SYSTEM AND METHOD OF CONTROLLING THE SAME

(75) Inventor: Kazuo Saito, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 528 days.

(21) Appl. No.: 10/031,368

(22) PCT Filed: Apr. 17, 2001

(86) PCT No.: PCT/JP01/03275

§ 371 (c)(1),
(2), (4) Date: Jan. 18, 2002

(87) PCT Pub. No.: WO01/91216

PCT Pub. Date: Nov. 29, 2001

(65) Prior Publication Data

US 2002/0106537 A1 Aug. 8, 2002

(30) Foreign Application Priority Data

May 23, 2000 (JP) .................................. 2000-151962

(51) Int. Cl.$^7$ ............................................. H01M 8/04
(52) U.S. Cl. ........................ 429/13; 429/22; 429/24; 429/30
(58) Field of Search ..................... 429/12, 22, 23, 429/24, 26, 13, 30

(56) References Cited

U.S. PATENT DOCUMENTS 4,968,566 A    11/1990   Lersch et al.
5,786,104 A    7/1998    Black et al.

FOREIGN PATENT DOCUMENTS

| DE | 29 25 248 | 1/1981 |
|---|---|---|
| DE | 38 26 590 | 2/1990 |
| EP | 0 831 543 | 3/1998 |
| JP | 08-195211 | 7/1996 |
| JP | 09-027334 | 1/1997 |
| WO | 98/45890 | 10/1998 |

Primary Examiner—Frankie L. Stinson
Assistant Examiner—Monique Wills
(74) Attorney, Agent, or Firm—Foley & Lardner LLP (57) ABSTRACT

In a fuel cell system and its controlling method, the fuel cell system includes a stack 21 including fuel cells 11 each having a polymer electrolyte membrane 13, and a controller 61. The controller 61 is responsive to detected outputs of a displacement sensor 27 and a temperature sensor 27 and controls such that, when the polymer electrolyte membrane 13 is discriminated to remain in an excessively dry state, a shut-off valve 37 is applied with a "close" control signal to interrupt the supply of fuel gas to the stack 21 and, concurrently, a shut-off valve 41 is applied with an "open" control signal to allow air to be supplied to the stack 21 while applying a pump control signal to a pump 57 so as to maximize its rotational speed for thereby increasing the flow rate of pure water 59 to be circulated to the humidifier 35 from a pure water tank 55. Simultaneously, a timer of the controller 61 is operated to begin counting an incremental time. As a result, air is excessively humidified by the humidifier 35 and is supplied to the stack 21 via the shut-off valve 41.

10 Claims, 5 Drawing Sheets

DISPLACEMENT DUE TO
THERMAL EXPANSION

DISPLACEMENT POSITIONS
DEPENDING WET CONDITIONS

FUEL CELL SYSTEM AND METHOD OF CONTROLLING THE SAME

TECHNICAL FIELD

The present invention relates to a fuel cell system and a method of controlling the same, and more particularly, to a fuel cell control system of a polymer electrolyte type and a method of controlling a fuel cell of the polymer electrolyte type.

BACKGROUND ART

In recent years, considerable research and development work has been undertaken to commercially apply a fuel cell of polymer electrolyte membrane type, which has a high power density and which can be operated at low temperature, as an electric power generation system in a motor vehicle.

Such a fuel cell of the polymer electrolyte membrane is usually constructed of a polymer electrolyte membrane, an anode joined to one side of the membrane, and a cathode joined to the other side of the membrane to provide a joined structure, which is sandwiched between separators.

In a fuel cell system including a plurality of fuel cells of polymer electrolyte membrane type as a stack, fuel gas and air are usually humidified by a humidifier for preventing the polymer electrolyte membrane from being dried such that the polymer electrolyte membrane is kept in a suitably wet state throughout electric power generation.

DISCLOSURE OF INVENTION

In such a fuel cell system, however, a usual practice normally done in usual operation of the stack has been adapted to start up the stack, even when the fuel cell system is left in a non-use state for a long time period and the polymer electrolyte membrane remains in an excessively dry state.

For this reason, humidification of the polymer electrolyte membrane to a sufficiently wet state needs a preliminary longer operating time to some extent, with a resultant difficulty in taking out electric power output from the stack in a stable fashion or an undesirable system failure owing to rapid voltage drop caused when a large amount of electric power output is required.

The present invention has been made in view of the above-described studies and has an object to provide a fuel cell system and a method controlling the same which can achieve a substantially optimum start-up control even when a fuel cell system of a polymer electrolyte type remains in a dry state.

A fuel cell system of the present invention is provided with: a humidifier humidifying fuel gas and air; a stack producing electric power by reacting the fuel gas humidified by the humidifier and the air humidified by the humidifier, including a plurality of fuel cells and fixed for free movement in a stacked direction thereof, each of the plurality of fuel cells having a polymer electrolyte membrane; a displacement sensor detecting a displacement value in length of the stack in the stacked direction; a temperature sensor detecting a temperature of the stack; and a controller discriminating whether the polymer electrolyte membrane is in a dry state in response to the displacement value of the stack detected by the displacement sensor and the temperature of the stack detected by the temperature sensor and controlling the humidifier, when the polymer electrolyte membrane is discriminated as in a dry state at a start of operation of the stack, to cause the polymer electrolyte membrane to be brought into a wet state.

In other words, a fuel cell system of the present invention is provided with: humidifying means humidifying fuel gas and air; a stack producing electric power by reacting the fuel gas humidified by the humidifying means and the air humidified by the humidifying means, including a plurality of fuel cells and fixed for free movement in a stacked direction thereof, each of the plurality of fuel cells having a polymer electrolyte membrane; displacement detecting means detecting a displacement value in length of the stack in the stacked direction; temperature detecting means detecting a temperature of the stack; and controlling means discriminating whether the polymer electrolyte membrane is in a dry state in response to the displacement value of the stack detected by the displacement detecting means and the temperature of the stack detected by the temperature detecting means and controlling the humidifying means, when the polymer electrolyte membrane is discriminated as in a dry state at a start of operation of the stack, to cause the polymer electrolyte membrane to be brought into a wet state.

Besides, a method of controlling a fuel cell system is applied to a system provided with a humidifier humidifying fuel gas and air, and a stack producing electric power by reacting the fuel gas humidified by the humidifier and the air humidified by the humidifier, including a plurality of fuel cells and fixed for free movement in a stacked direction thereof, each of the plurality of fuel cells having a polymer electrolyte membrane. The method detects a displacement value in length of the stack in the stacked direction and a temperature of the stack, discriminates whether the polymer electrolyte membrane is in a dry state in response to the displacement value of the stack detected by the displacement sensor and the temperature of the stack detected by the temperature sensor, and controls the humidifier, when the polymer electrolyte membrane is discriminated as in a dry state at a start of operation of the stack, to cause the polymer electrolyte membrane to be brought into a wet state.

Other and further features, advantages, and benefits of the present invention will become more apparent from the following description taken in conjunction with the following drawings.

BEST MODE FOR CARRYING OUT THE INVENTION

To describe the present invention in more detail, preferred embodiments of the present invention will be explained with reference to the drawings below.

(First Embodiment)

Figure 1:
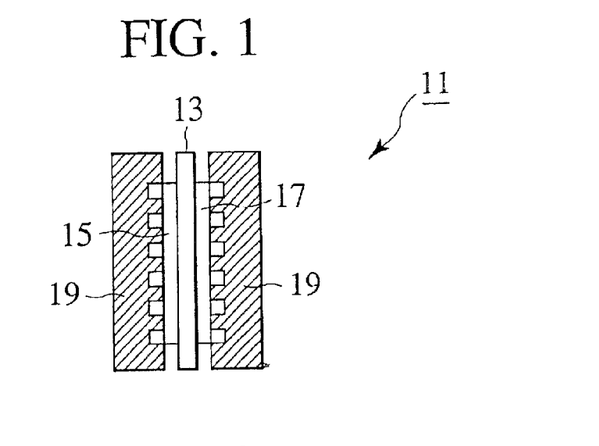
FIG. 1 is a view for illustrating a cell structure of a polymer electrolyte membrane type fuel cell to be incorporated in a fuel cell system according to a first preferred embodiment of the present invention.

FIG. 1 shows a cell structure of a polymer electrolyte type fuel cell for a fuel cell system of a preferred embodiment according to the present invention.

In FIG. 1, the fuel cell 11 is constructed having a polymer electrolyte 13, an anode electrode 15 located on one side of the polymer electrolyte membrane 13, a cathode 17 located on the other side of the polymer electrolyte membrane 13 to form a membrane electrode assembly (MEA), which is sandwiched between separators 19.

Figure 2:
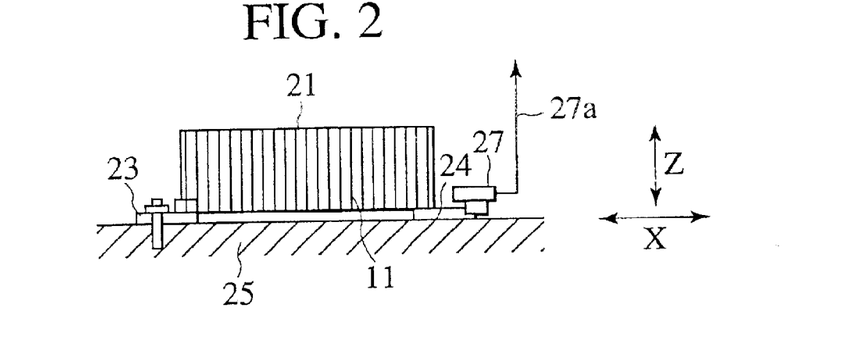
FIG. 2 is a schematic view for illustrating a typical example of a fixing structure for a stack constructed of a plurality of fuel cells according to the embodiment.

FIG. 2 is a view illustrating a typical example of a fixing structure of a stack which is comprised of a plurality of fuel cells.

Since the stack 21 is constructed of a large number of fuel cells 11, the stack 21 causes the polymer electrolyte membrane 13 to swell due to humidifying water, with a resultant expansion and contraction caused in each of the separators 19 in a stacked direction X owing to thermal expansion.

For this reason, one distal end of the stack 21 is fixedly fastened to a vehicle body 25 by means of a stationary fixture 23, and the other distal end of the stack 21 is connected to the vehicle body 25 via a movable fixture 24 so as to prevent vertical movement in a direction Z while allowing expanding and contracting movement in the stacked direction X. Also, a displacement sensor 27 is located on the movable fixture 24 and detects current displacement value relative to an original length of the stack 21 measured at a fabricating stage thereof, producing a displacement detection signal 27a which is delivered to a controller 61 in a manner as will be described in detail.

Figure 3:
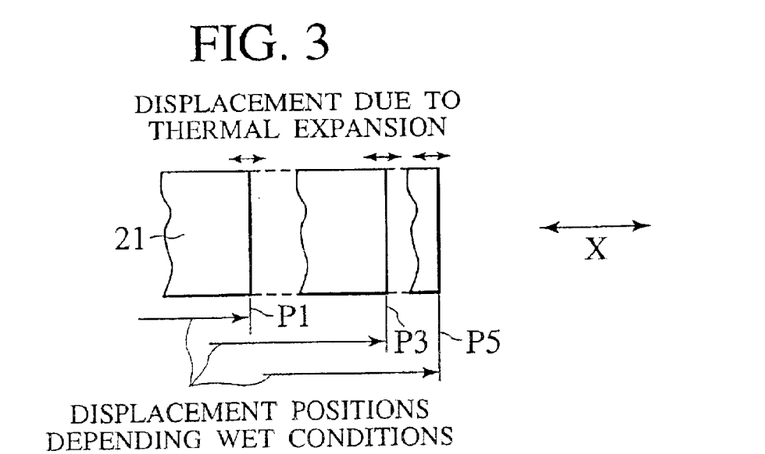
FIG. 3 is a view for illustrating a displacement characteristic in length of the stack in a stacked direction depending on differences in a wet state of the stack according to the embodiment.

FIG. 3 is a view for illustrating the displacement characteristic of the stack 21 in conjunction with a varying length in the stacked direction X due to a difference in a wet state of the stack 21.

In the event the polymer electrolyte membrane 13 of the stack 21 does not contain water immediately when it has been fabricated or when the stack 21 has been left in anon-operating state for a long time period to cause the stack 21 to remain in an extremely dry state, the stack 21 remains in a minimum displacement position P1, representing the shortest length of the stack and an extremely dry state, as shown in FIG. 3.

On the contrary, when the stack 21 is continuously humidified in a suitably wet state and is operating at the maximum power output, the stack 21 encounters swelling and thermal expansion to assume a proper wet position P5, equal to the longest length of the stack, as shown in FIG. 3 during electric power generation. Further, when the operation of the fuel stack 21 is repeated at suitable periods, the polymer electrolyte membrane 13 is liable to contain water and, therefore, the stack 21 assumes a normal wet position P3, equal to an intermediate length closer to the proper wet position P5, as shown in FIG. 3 even when the stack 21 remains in a normal non-operating state.

Figure 4:
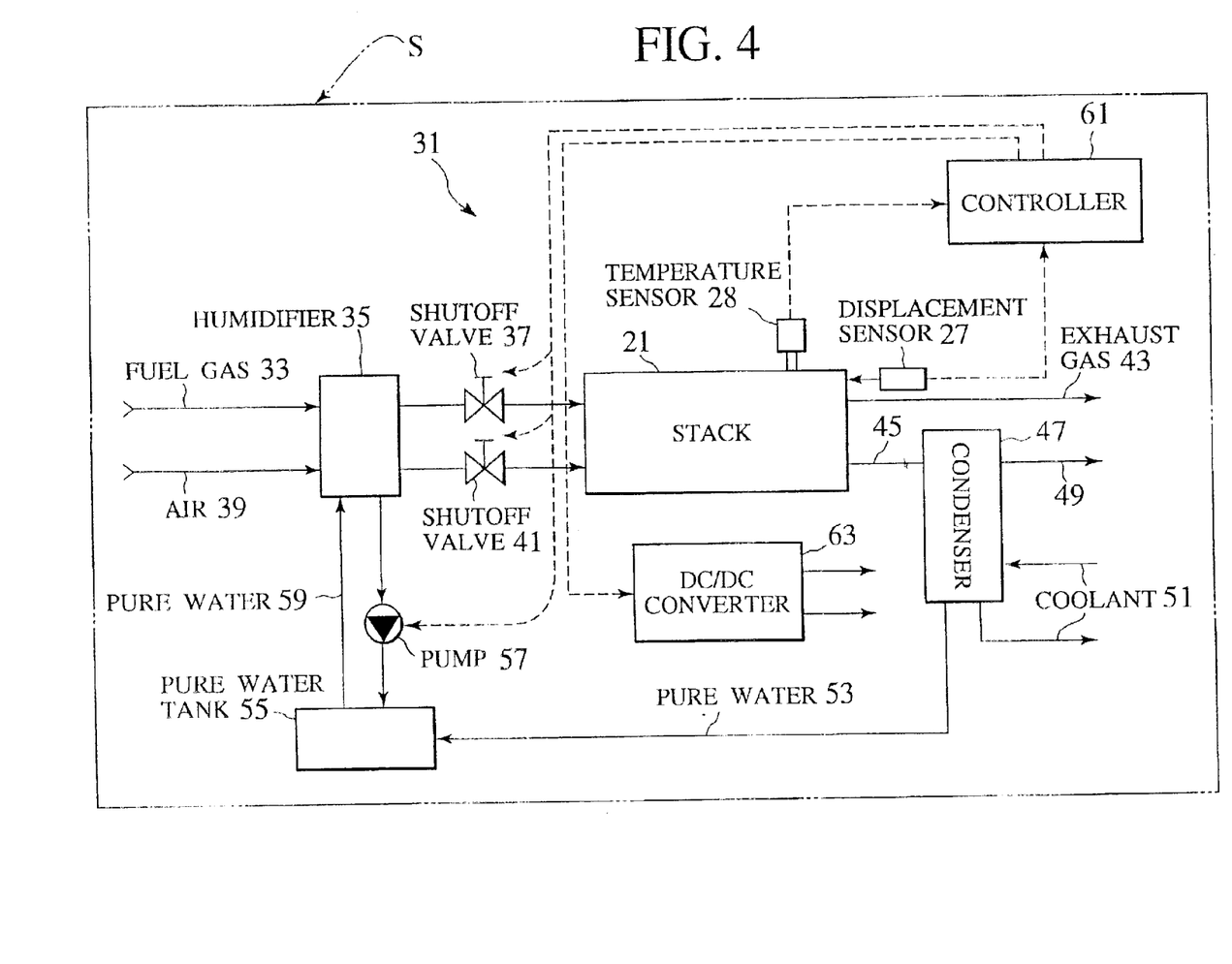
FIG. 4 is a block diagram of a starter device for a fuel cell system according to the embodiment.

FIG. 4 is a block diagram showing a starter device 31 of a fuel cell system of a first preferred embodiment according to the present invention. A structure of the starter device 31 of the fuel cell system S of FIG. 3 will be mainly described below in detail.

Fuel gas 33 is hydrogen gas or reformed gas delivered from for example a reformer (not shown) and is supplied to a humidifier 35 which humidifies fuel gas 33. Humidified fuel gas is then supplied through a shut-off valve 37 to the stack 21. Also, air 39 is supplied from for example an air compressor (not shown) and is humidified in the humidifier 35. Humidified air is then supplied through a shut-off valve 41 to the stack 21.

In the stack 21, humidified fuel gas and humidified air are reacted to produce electric power output, with non-reacted exhaust gas 43 being emitted and non-reacted air 45 being also exhausted through a condenser 47 which emits exhaust air 49. Further, a temperature sensor 28 is mounted on the stack 21 for detecting the temperature thereof and producing a temperature detection signal 28a which is applied to the controller 61.

In the condenser 47, air 45 emitted from the stack 21 is passed through plural cooling fins through which coolant 51 is circulated, thereby condensing surplus water contained in air 45 to recover the same. Recovered pure water 53 is fed to a pure water tank 55.

The pure water tank 55 serves to capture ions from pure water 53 with the use of an ion filter and stores the same therein and, subsequently, pure water 59 is pressurized with a pump 57 and supplied to the humidifier 35.

The controller 61 includes a RAM (not shown) which stores control data, a ROM (not shown) which stores control programs, a CPU (not shown) which controls a system in accordance with the control programs, and a timer (not shown) which counts preset increment times to produce an interrupting signal INT which is applied to the CPU.

The controller 61 is responsive to the displacement detection signal 27a delivered from the displacement sensor 27 and the temperature detection signal 28a delivered from the temperature detection sensor 28 to discriminate whether the polymer electrolyte membrane located in the stack 21 remains in a dry state or is in a wet state, thereby producing a pump control signal 61a so as to control the shut-off valves 37 and 41 and the pump 57 such that, in the event of an excessively dry state, they are operated in a dry-state start sequence and, in the event of the wet state, they are switched over to and are controlled to start operation in a normal start sequence.

A DC/DC converter 63 is applied with electric power output from the stack 21 and functions to achieve a voltage boost conversion or voltage lowering conversion responsive to a demanded power command signal 61b delivered from the controller 61 for thereby controlling and limiting the amount of electric power output, to be delivered from the stack 21, which is supplied through the DC/DC converter 63 to a battery (not shown) which serves as a load, and other load units (not shown).

Figure 5:
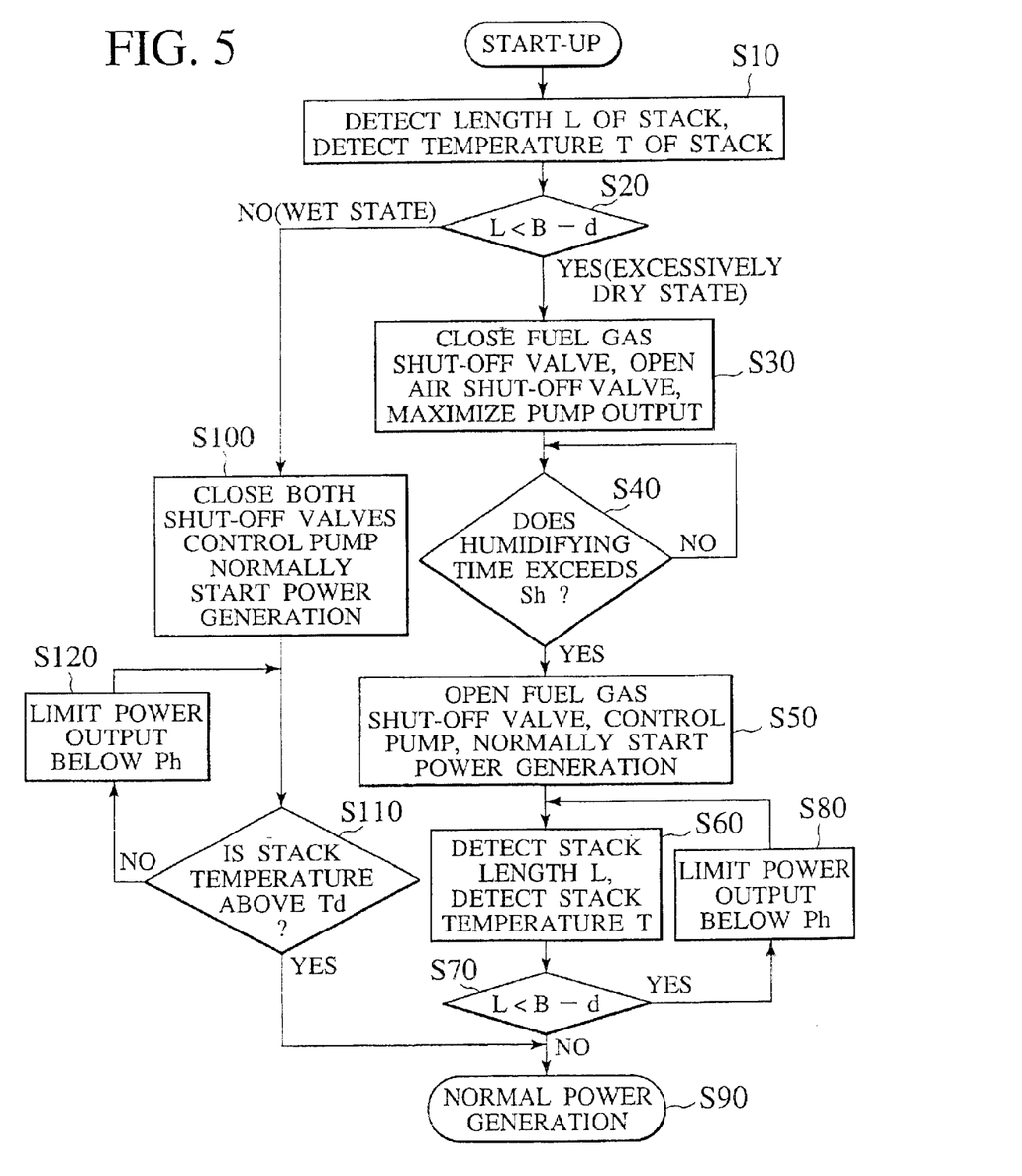
FIG. 5 is a flow diagram to illustrate the operation of the starter device of the fuel cell system according to the embodiment.

Now, the operation of the starter device 31 of the fuel cell system of the first preferred embodiment is described below in detail with reference to a general flow diagram shown in FIG. 5. The basic sequence of operations illustrated in the general flow diagram of FIG. 5 is stored as the control program in the internal ROM of the controller 61.

At the start-up operation, power is applied to the starter device 31 of the fuel cell system, thereby starting up operation of the controller 61. At this instant, the controller 61 begins to read out the control program stored in the ROM and to control in a manner described below.

In a first execution of step S10, the displacement value L in the length of the stack 21 and the temperature T thereof are watched and detected at all times by the displacement sensor 27 and the temperature sensor 28, respectively.

In conjunction with the displacement value L of the stack 21, the length of the stack 21, which has been originally measured at the fabrication stage, is preliminarily stored as a reference data in the RAM of the controller 61. Also, when the stack 21 is replaced with new one, it is required to renew this reference data. Further, the RAM of the controller 61 preliminarily stores therein parameters covering other displacement values caused by thermal expansion responsive to the stack temperature T.

In the next step S20, the wet state of the polymer electrolyte membrane is discriminated in terms of the displacement value L and the temperature T which are detected by the displacement sensor 27 and the temperature sensor 28, respectively. A process for discriminating the wet state of the polymer electrolyte membrane will be described in detail below.

For instance, in a case where a separator is made of for example carbon, the instantaneous value is obtained from the original length A measured at the fabricating stage, the length B measured when the stack is held in a non-operating state under a suitable wet state (namely, when the stack is held in the non-operating state at a normal temperature), the length C measured when the stack is operating in a normal state at the maximum power output, and the maximum displacement value d, caused by thermal expansion, of the stack, i.e. is expressed by the following relation:

$$A+d<B-d \qquad (1)$$

Also, the maximum displacement valued of the stack caused by thermal expansion is derived from the coefficient $\beta$ of linear expansion in the stacked direction X, the temperature T and the length A' measured at 0° C. during the fabricating step and is expressed as:

$$d=\beta \times T \times A' \qquad (2)$$

With this equation (2), the formula (1) is expressed as:

$$A+\beta \times T \times A' < B - \beta \times T \times A' \qquad (3)$$

The formula (1) is proved from a reason in that although the coefficient of thermal expansion of the separator made of carbon is on the order of $10^{-6}$, the amount of swelling (,i.e. though it depends on the film thickness and a chemical structure of the polymer electrolyte membrane) of the polymer electrolyte membrane due to wet state is on the order of $10^{-1}$.

For this reason, the stack encounters thermal expansion which is larger in value at all times when the stack temperature is low under a suitable wet state in the polymer electrolyte membrane, than that encountered when the stack temperature is high under an extremely dry state in the polymer electrolyte membrane.

Accordingly, in the event the length L of the stack detected by the displacement sensor 27 at the start of operation is obtained by:

$$L < B - d = B - \beta \times T \times A' \qquad (4)$$

that is, when the length L of the stack is less than the instantaneous value in which the maximum displacement value d caused by thermal expansion is subtracted from the length B of the stack measured when it is held in the non-operating state under the suitable wet state, it can be found that the polymer electrolyte membrane remains in the excessively dry state.

In the second execution of step S20, also, the controller 61 discriminates on the basis of the detected values of the displacement sensor 27 and the temperature sensor 28 that the polymer electrolyte membrane remains in the excessively dry state and, in this event, the operation goes to step S30.

In step S30, the shut-off valve 37 located between the humidifier 35 and the stack 21 is applied with a "close" control signal for interrupting the supply of fuel gas to the stack 21 and, concurrently, the shut-off valve 41 located between the humidifier 35 and the stack 21 is applied with an "open" control signal for allowing air to be supplied to the stack 21. Simultaneously, the pump 57 is applied with the pump control signal which allows the rotational speed to be maximized, thereby increasing the flow rate of pure water 59 to be circulated to the humidifier 35 from the pure water tank 55. At the same time, the timer in the controller 61 begins to count the incremental time. As a result, air, which is excessively humidified by the humidifier 35, is supplied to the stack 21 through the shut-off valve 41.

In the succeeding step S40, the counted incremental time is read out from the timer and the polymer electrolyte membrane of the stack 21 is humidified until the humidifying time period reaches a predetermined time period Sh.

When the humidifying time period reaches the predetermined incremental time Sh, the operation goes to step S50 and, in this step, in addition to supplying the air, the shut-off valve 37 located between the humidifier 35 and the stack 21 is applied with an "open" control signal to begin the supply of fuel gas to the stack 21 while applying the pump control signal 61a to the pump 57 such that the flow rate thereof is returned to its normal value to allow the stack 21 to begin power generation.

Then in step S60, in the same manner as previously noted in step S10, the displacement sensor 27 and the temperature sensor 28 detect the displacement value L of the length of the stack and the temperature thereof.

In the succeeding step S70, in the same manner as previously noted in step S20, the controller 61 responds to the detected values of the displacement sensor 27 and the temperature sensor 28, respectively, and if it is found that the polymer electrolyte membrane remains in the dry state, the operation returns to step S80.

In step S80, the amount of electric power output to be extracted from the stack 21 is regulated to a limited value below a predetermined value Ph. In particular, the electric power output of the stack 21 is delivered to the DC/DC converter 63, which converts the voltage upward or downward in response to the demanded power command signal 61b applied from the controller 61 and controls the amount of electric power to be extracted from the stack 21 to the limited value below the predetermined value Ph, thereby allowing electric power output from the DC/DC converter 63 to the battery (not shown) and the other load units (not shown). Operation then returns to step S60 and the above discussed process is repeated.

In the execution of step S70, if it is found that the polymer electrolyte membrane is not held in the dry state and remains in a sufficiently wet state, operation goes to step S90 to allow the stack 21 to produce electric power output in a normal operating mode. In particular, the demanded power command signal 61b applied from the controller 61 to the DC/DC converter 63 is modulated to have a normal power level by which the DC/DC converter 63 controls for relaxing the limitation in voltage boost conversion or voltage lowering conversion, thereby allowing normal electric power to be supplied from the DC/DC converter 63 to the battery (not shown) and the other load units (not shown).

Thus, it can be found on the basis of the length L of the stack and the temperature T thereof that the polymer electrolyte membrane located in the stack 21 is sufficiently wet, and the amount of electric power to be utilized is regulated to the limited value below the predetermined value Ph until the maximum electric power output is obtained. As a result, it is possible to suppress undesirable situations such as a sudden stop caused in a system owing to some reasons such as rapid voltage drop.

In the execution of step S20, if it is found by the controller 61 on the basis of the detected values of the displacement sensor 27 and the temperature sensor 28, respectively, that the polymer electrolyte membrane located in the stack 21 is not held in the excessively dry state and remains in the wet state, operation goes to step S100.

In the execution of step S100, both the shut-off valves 37 and 41 located between the humidifier 35 and the stack 21 are applied with "open" control signals, allowing fuel gas and air to be supplied to the stack 21. Concurrently, the controller 61 applies the pump control signal 61a to the pump 57 to render the flow rate thereof to have a normal value, allowing the stack 21 to begin to produce electric power output.

In the succeeding step S110, the controller 61 reads out the detected value of the temperature sensor 28 to discriminate whether the stack temperature T exceeds or is below a preset temperature Td. When the stack temperature is below the preset temperature Td, operation returns to step S120 wherein, in the same manner as in the step S80, the amount of electric power to be extracted from the stack 21 is limited below the predetermined value Ph.

In the execution of the step S110, if it is found that the stack temperature exceeds the preset temperature Td, operation then returns to step S90 to allow the stack to operate in the normal power generation mode.

According to the first preferred embodiment of the present invention, the wet state of the polymer electrolyte membrane located in the stack is detected and, even when the polymer electrolyte membrane remains in an excessively dry state, the stack can be started up after the wet state is recovered, enabling electric power output to be extracted from the stack in a stable fashion while avoiding the rapid voltage drop caused during large electric power generation to enable the fuel cell system to start-up in a smooth fashion at all times.

Another advantage of the first preferred embodiment resides in that the fuel cell system can be realized by merely incorporating a simplified structure therein to allow a displacement sensor to be mounted in the stack. As a result, further, it is possible to realize the fuel cell system by merely adding this start-up process thereto in a relatively easy fashion.

In addition, the wet state of the stack can be detected, with a resultant decrease in trouble shooting time required for some troubles occurred in the stack.

(Second Embodiment)

Figure 6:
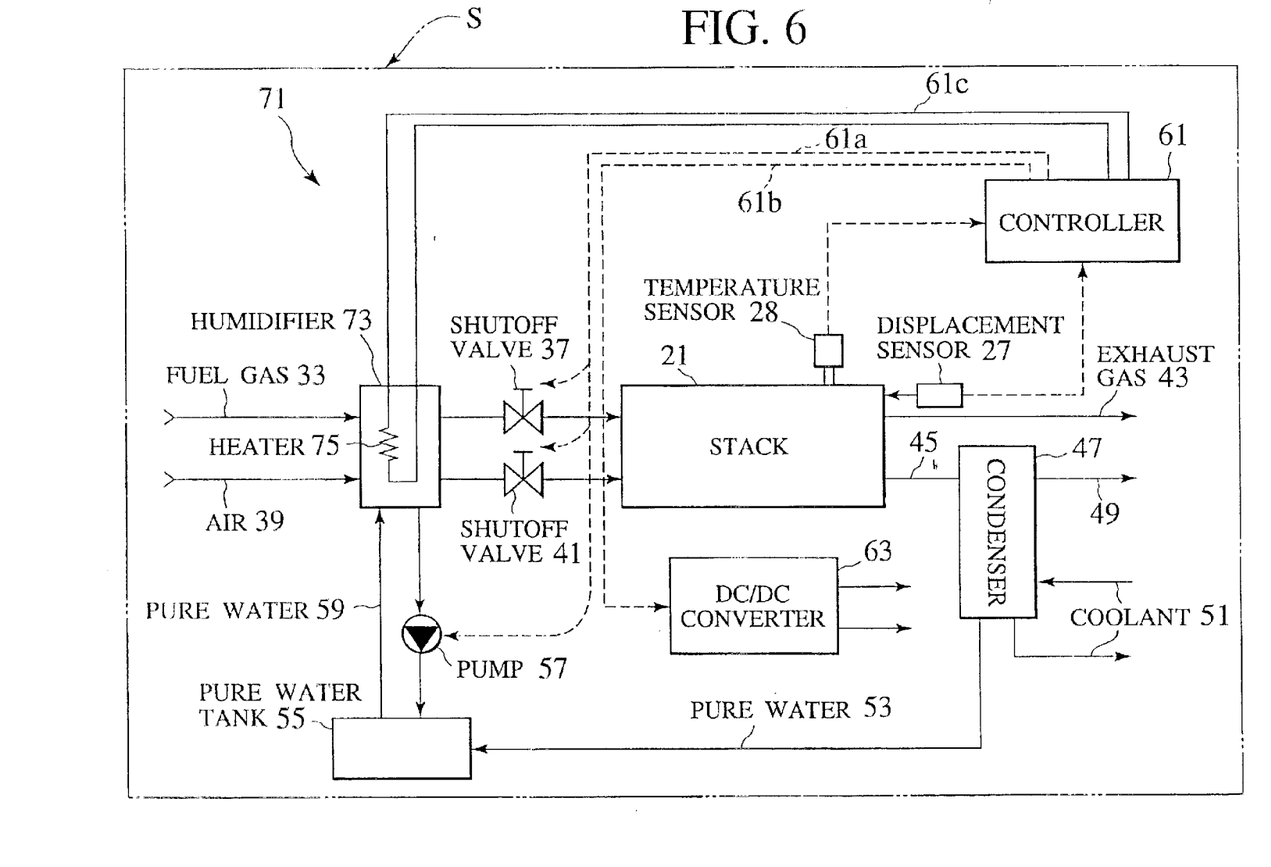
FIG. 6 is a block diagram of a starter device of a fuel cell system according to a second preferred embodiment of the present invention.

FIG. 6 is a block diagram for illustrating the structure of a starter device 71 of a fuel cell system of a second preferred embodiment according to the present invention. Also, the second preferred embodiment has the same basic structure as that of the fuel cell system of the first preferred embodiment shown in FIG. 4, with like parts bearing like reference numerals as those used in FIG. 4 while detailed description of the like parts are omitted for the sake of clarity.

An essential feature of the second preferred embodiment differs from that of the first preferred embodiment in that a humidifier 73 incorporates therein a heater 75.

Figure 7:
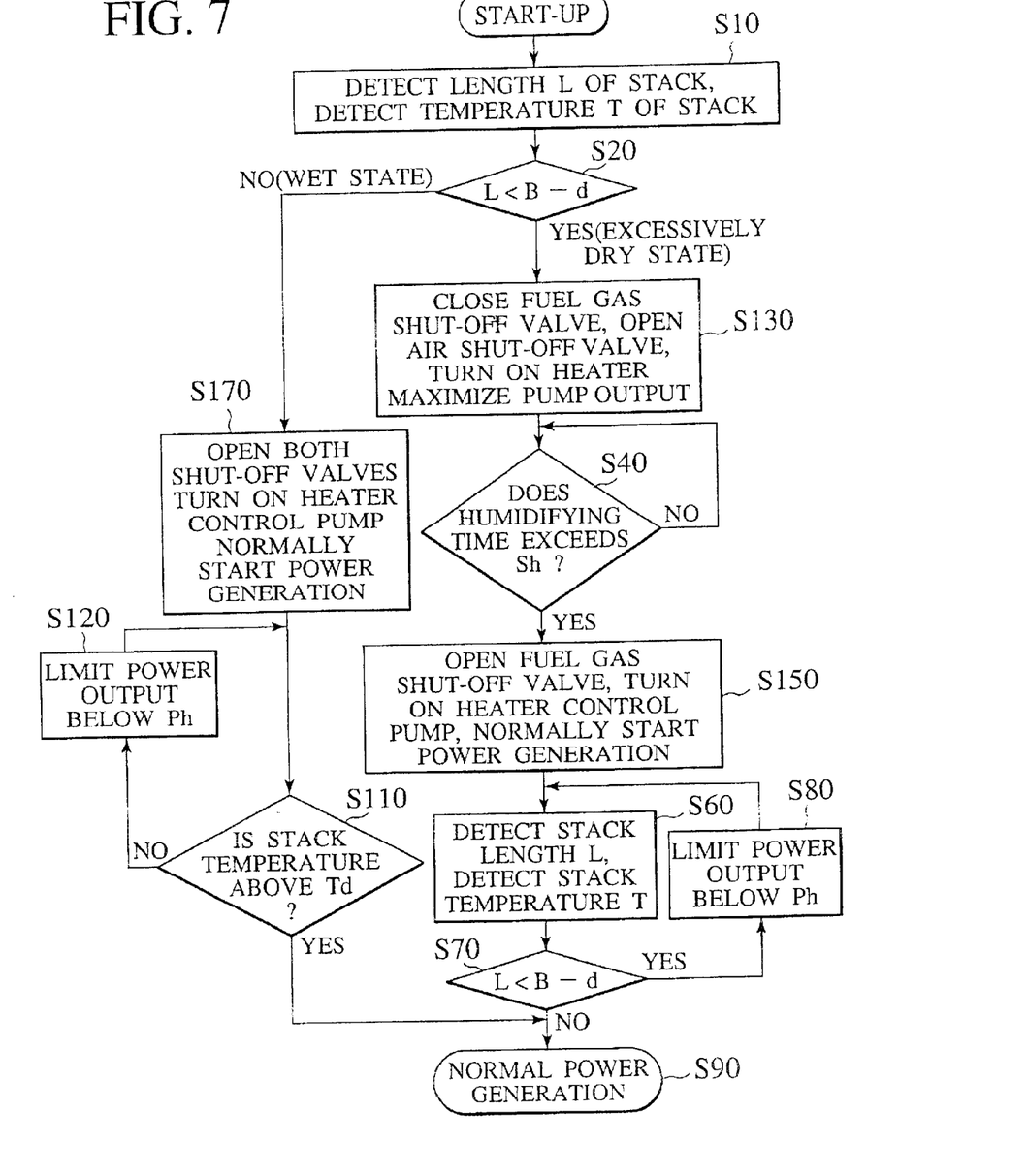
FIG. 7 is a flow diagram to illustrate the operation of the starter device of the fuel cell system according to the embodiment.

The operation of the starter device 71 of the fuel cell system of the second preferred embodiment will be described in detail with reference to a general flow diagram shown in FIG. 7. The basic sequence of operations illustrated in the general flow diagram of FIG. 7 is stored as the control program in the internal ROM of the controller 61.

Also, the second preferred embodiment has the same basic steps as those in the flow diagram of the first preferred embodiment shown in FIG. 5, with like steps bearing like reference numerals as those used in FIG. 5 while a detailed description of the like steps is omitted for the sake of clarity.

In the execution of step S130, with which the step S30 in the first preferred embodiment is replaced, the shut-off valve 37 located between the humidifier 73 and the stack 21 is applied with a "close" control signal to interrupt the supply of fuel gas to the stack 21 while, concurrently, applying an "open" control signal to the shut-off valve 41 located between the humidifier 73 and the stack 21 to allow air to be supplied to the stack 21. Simultaneously, the heater 75 located in the humidifier 73 is applied with electric power 61c, and the pump control signal 61a is applied to the pump 57 from the controller 61 so as to maximize the rotational speed of the pump 57 for increasing the flow rate of pure water 59 to be circulated to the humidifier 73 from the pure water tank 55. At the same time, the timer in the controller 61 is caused to begin counting operation of the incremental time.

As a result, even when the polymer electrolyte membrane located in the stack 21 remains in an excessively dry state at the start of operation, the heater 75 in the humidifier 73 is heated to produce a further excessively humidified air, which is supplied through the shut-off valve 41 to the stack 21, with a resultant decrease in the operating time required for wetting the polymer electrolyte membrane.

In the execution of step S150, with which the step S50 in the first preferred embodiment is replaced, the shutoff valve 37 located between the humidifier 35 and the stack 21 is applied with an "open" control signal to begin the supply of fuel gas to the stack 21 in addition to supplying the air, while the heater 75 located in the humidifier 73 is applied with electric power 61c and applying the pump control signal 61a to the pump 57 such that the flow rate thereof is returned to its normal value to allow the stack 21 to begin power generation.

As a result, even when the polymer electrolyte membrane located in the stack 21 is once humidified during a predetermined time period, the heater 75 in the humidifier 73 is heated to produce a further excessively humidified air, which is supplied through the shut-off valve 41 to the stack 21, with a resultant decrease in the operating time required for wetting the polymer electrolyte membrane.

In the execution of step S170, with which the step S110 in the first preferred embodiment is replaced, the shut-off valves 37 and 41 located between the humidifier 73 and the stack 21 are applied with "open" control signals to begin the supply of fuel gas and air to the stack 21 while applying electric power to the heater 75 located in the humidifier 73. Simultaneously, the pump control signal 61a is delivered from the controller 61 to the pump 57 so as to regulate the flow rate to a normal value and to allow the stack 21 to begin electric power generation.

As a result, even when the polymer electrolyte membrane located in the stack 21 remains in a normal, wet state at the start of operation, the heater 75 located in the humidifier 73 is heated to provide an excessively humidified air to the stack 21 via the shut-off valve 41, allowing the polymer electrolyte membrane to be wet in a reduced, operating time period.

A typical advantage of the second preferred embodiment resides in that an increase in the amount of humidification reduces the wait time for wetting a polymer electrolyte membrane.

In the present invention, the reliability in operation of the fuel cell system is greatly enhanced to provide a stable operation in the fuel cell system at all times even when it remains in an excessively dry state. Unlike a structure of a fuel cell system employing a humidification process which begins to humidify the polymer electrolyte membrane in a normal mode at the start-up operation, the system of the present invention has a controller which allows the polymer electrolyte membrane of the stack to be suitably wet in the shortest period at the start-up operation even when the polymer electrolyte membrane remains in the excessively dry state. The obvious result is the elimination of wait time during start-up of the system and system failures that would otherwise occur when large power output is consumed when the stack remains in the dry state.

Since the dry state of the stack is discriminated in terms of the displacement value in length of the stack in the stacked direction and the temperature of the stack, an optimum start-up control of the fuel cell system is provided with greatly simplified operating process and rapid start-up of the fuel cell system at full load can be achieved in a highly reliable manner. This optimum start up control can be achieved with the use of minimum number of component parts without causing a remarkable increase in cost. Thus, the system of the invention can be easily applied to existing fuel cell systems to improve the operating performance.

The controller controls the fuel cell system such that, when the stack remains in the dry state, humidified air is merely supplied to the stack to render the polymer electrolyte membrane to be wet in the short period. This control is achieved in an easy fashion by opening or closing plural shut-off valves located between the humidifier and the stack.

Further, during start-up of the fuel cell system, when the polymer electrolyte membrane of the stack remains in the dry state, the controller controls the humidifier such that humidified air is first supplied to the stack for a predetermined time period and subsequently humidified fuel gas is also supplied to the stack and also controls the stack such that electric power output generated by the stack is limited below a predetermined value until the polymer electrolyte membrane is brought into a sufficiently wet state. This results in the elimination of the voltage drops or system failures caused thereby.

Still further, a heater may be incorporated in the humidifier to provide further excessively humidified fuel gas and air to the stack, reducing the operating time required for wetting the polymer electrolyte membrane to a sufficient level for thereby enabling the fuel cell system to start up in a short period even when the polymer electrolyte membrane remains in the dry state.

INDUSTRIAL APPLICABILITY

As described above, in the present invention, a dry state of a stack in a fuel cell system is watched in terms of a displacement value in length of the stack and a temperature of the stack, and the amount of humidification in fuel gas and air is controlled to allow a polymer electrolyte membrane of the stack to be suitably wet in a highly efficient and reliable manner. Therefore, a wide applicability thereof including a fuel cell system for a vehicle is expected.

What is claimed is:

1. A fuel cell system comprising:
    a humidifier humidifying fuel gas and air;
    a stack producing electric power by reacting the fuel gas humidified by the humidifier and the air humidified by the humidifier, including a plurality of fuel cells and fixed for free movement in a stacked direction thereof, each of the plurality of fuel cells having a polymer electrolyte membrane;
    a displacement sensor detecting a displacement value in length of the stack in the stacked direction;
    a temperature sensor detecting a temperature of the stack; and
    a controller discriminating whether the polymer electrolyte membrane is in a dry state in response to the displacement value of the stack detected by the displacement sensor and the temperature of the stack detected by the temperature sensor, and controlling the humidifier, when the polymer electrolyte membrane is discriminated as in a dry state at a start of operation of the stack, to cause the polymer electrolyte membrane to be brought into a wet state.

2. A fuel cell system according to claim 1, wherein the controller controls the humidifier, when the polymer electrolyte membrane is discriminated as in the dry state at the start of operation, to supply the air through the humidifier to the stack for a predetermined time period while not supplying the fuel gas through the humidifier to the stack.

3. A fuel cell system according to claim 2, wherein the controller controls the humidifier, after only the air has been supplied to the stack through the humidifier for the predetermined time period, to supply the fuel gas and the air through the humidifier to the stack, while controlling the stack such that the electric power output from the stack is regulated to a limited value below a predetermined value until the polymer electrolyte membrane is determined as in a wet state.

4. A fuel cell system according to claim 1, wherein the humidifier includes a heater heating the fuel gas and the air, and the stack produces the electric power by reacting the fuel gas humidified and heated by the humidifier and the air humidified and heated by the humidifier.

5. A fuel cell system according to claim 4, wherein the controller controls the humidifier, when the polymer electrolyte membrane is discriminated as in the dry state at the start of operation, to supply the air through the humidifier to the stack for a predetermined time period while not supplying the fuel gas through the humidifier to the stack.

6. A fuel cell system according to claim 5, wherein the controller controls the humidifier, after only the air has been supplied to the stack through the humidifier for the predetermined time period, to supply the fuel gas and the air through the humidifier to the stack, while controlling the stack such that the electric power output from the stack is regulated to a limited value below a predetermined value until the polymer electrolyte membrane is determined as in a wet state.

7. A fuel cell system according to claim 1, wherein the controller controls the humidifier to supply the fuel gas and the air through the humidifier to the stack when the polymer electrolyte membrane is discriminated as in a wet state at the start of operation of the stack.

8. A fuel cell system according to claim 7, wherein the controller controls the humidifier to supply the fuel gas and the air through the humidifier to the stack, while controlling the stack such that the electric power output from the stack is regulated to a limited value below a predetermined value until the temperature of the stack exceeds a predetermined temperature.

9. A fuel cell system comprising:
    humidifying means humidifying fuel gas and air;
    a stack producing electric power by reacting the fuel gas humidified by the humidifying means and the air humidified by the humidifying means, including a plurality of fuel cells and fixed for free movement in a stacked direction thereof, each of the plurality of fuel cells having a polymer electrolyte membrane;

a displacement detecting means detecting a displacement value in length of the stack in the stacked direction;

temperature detecting means detecting a temperature of the stack; and controlling means discriminating whether the polymer electrolyte membrane is in a dry state in response to the displacement value of the stack detected by the displacement detecting means and the temperature of the stack detected by the temperature detecting means, and controlling the humidifying means, when the polymer electrolyte membrane is discriminated as in a dry state at a start of operation of the stack, to cause the polymer electrolyte membrane to be brought into a wet state.

10. A method of controlling a fuel cell system provided with a humidifier humidifying fuel gas and air, and a stack producing electric power by reacting the fuel gas humidified by the humidifier and the air humidified by the humidifier, including a plurality of fuel cells and fixed for free movement in a stacked direction thereof, each of the plurality of fuel cells having a polymer electrolyte membrane, the method comprising:

detecting a displacement value in length of the stack in the stacked direction;

detecting a temperature of the stack;

discriminating whether the polymer electrolyte membrane is in a dry state in response to the displacement value of the stack detected by the displacement sensor and the temperature of the stack detected by the temperature sensor; and controlling the humidifier, when the polymer electrolyte membrane is discriminated as in a dry state at a start of operation of the stack, to cause the polymer electrolyte membrane to be brought into a wet state.

* * * * *